United States Patent Office 3,072,707
Patented Jan. 8, 1963

3,072,707
ARYL DISULFIDES
Robert M. Pierson, Ravenna, Arthur H. Weinstein, Akron, Bernard Wargotz, Cuyahoga Falls, and Glen E. Meyer, Kent, Ohio, assignors to The Goodyear Tire & Rubber Company, Akron, Ohio, a corporation of Ohio
No Drawing. Filed June 12, 1956, Ser. No. 590,823
15 Claims. (Cl. 260—470)

This invention relates to new compositions of matter. More specifically it relates to substituted aromatic disulfides represented by the general formula:

$$(X-Y)_n-Ar-S-S-Ar-(Y-X)_n$$

in which Ar is selected from the group consisting of phenyl and naphthyl radicals, $n$ is a whole number not greater than 2, Y is a radical selected from the group consisting of —R—; —R—O—;

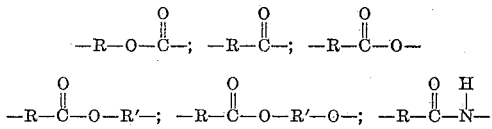

X is attached to any of the carbon atoms in the R portion of Y and is at least one and not more than 2 of the same radical selected from the group consisting of Cl—, Br—, $H_2N$—,

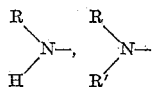

and in which R and R' are selected from the group consisting of primary, secondary and tertiary alkyl radicals containing from one to four carbon atoms.

Specific alkyl radicals coming within the definition of R and R' are methyl, ethyl, propyl, isopropyl, n-butyl, isobutyl, tert-butyl, and 1-methyl propyl. If more than one reactive constituent is attached to the R radical they may be attached to the same or different carbon atoms. In addition to being substituted by the reactive $$(X-Y)_n-$$

groups, the Ar radicals may be optionally substituted with one or more unreactive substituents such as halogen atoms, aliphatic radicals, alkoxy radicals or aromatic radicals, examples of which are fluoride, chloride, bromide, methyl ethyl, propyl, methoxy, ethoxy, propoxy and phenyl radicals.

The $(X-Y)_n$ portions of the general formula provide the disulfides with certain reactive constituents in the form of chloride, bromide, and primary, secondary and tertiary amino groups which become significant when these disulfides are employed in polymerization reactions to form reactive-end-group-containing addition polymers such as those described in copending application Serial No. 590,824, filed June 12, 1956. In copending application Serial No. 590,824 the disulfides claimed in this application are employed as modifiers to form reactive end group polymers by polymerizing conjugated diolefins alone or in mixture with comonomers which contain a vinylidene group in the presence of these disulfides. The aromatic disulfides containing reactive constituents cleave at the S—S linkage to impart to each end of the polymer molecule a thioether fragment which contains the reactive constituent. This produces an addition polymer which may undergo further reaction such as end-linking, cross-linking and co-curing.

Representative examples of the substituted aromatic disulfides coming within the definition of the general formula shown above are:

Bis-(2-chloromethyl-phenyl) disulfide
Bis-(2-bromomethyl-phenyl) disulfide
Bis-(4-β-bromoethyl-1-naphthyl) disulfide
Bis-(2-chloroacetamido-phenyl) disulfide
Bis-(2-bromoacetamido-phenyl) disulfide
Bis-(2-β-bromopropionamido-phenyl) disulfide
Bis-(4-chloroacetamido-1-naphthyl) disulfide
N-dichloroacetyl, N'-chloroacetyl bis-(amino-phenyl) disulfide
Bis-(2-chloroacetoxymethyl-phenyl) disulfide
Bis-(4-β-bromoethoxycarbonyl-2,6-xylyl) disulfide
Bis-(4-β-bromoethoxy-2,6 xylyl) disulfide
Bis-(2-dichloromethyl-phenyl) disulfide
Bis-(2-α,β-dichloroethyl-phenyl) disulfide
Bis-(2-γ-chloropropyl-phenyl) disulfide
Bis-(4-γ-bromopropyl-1-naphthyl) disulfide
Bis-(4-α,β-dichloropropyl-1-naphthyl) disulfide
Bis-(2-δ-bromobutyl-4 chlorophenyl) disulfide
Bis-(2-chloroaceto-phenyl) disulfide
Bis-(4-chloroaceto-2,6 xylyl) disulfide
Bis-(2,4-di-chloraceto-phenyl) disulfide
Bis-(2-bromoaceto-phenyl) disulfide
Bis-(4-bromoaceto-1-naphthyl) disulfide
Bis-(4-bromoaceto-5-methyl-1-naphthyl) disulfide
Bis-(4-β-bromopropoxy-1-naphthyl) disulfide
Bis-(2-δ-bromovaleramidophenyl) disulfide
Bis-(2α-chloropropionamidophenyl) disulfide
Bis-(2-α-bromomethyl-propionamidophenyl) disulfide
Bis-(4-bromomethyl-1-naphthyl) disulfide
Bis-(4-chloromethyl-1-naphthyl) disulfide
Bis-(4-β-β'-bromopropionoxy-ethoxy-1-naphthyl) disulfide
Bis-(4-chloracetoxymethoxyduryl) disulfide
Bis-(4-chloroacetoxy-1-naphthyl) disulfide
Bis-(3-β-bromoethoxycarboxylmethoxy mesityl) disulfide
Bis-(4-β-bromocarbethoxy-2-tolyl) disulfide
Bis-(4-β-dimethyl-amino-ethoxy-carboxy-2,6-xylyl) disulfide
Bis-(4-β-diethyl-amino-propoxy-carboxy-2,6-xylyl) disulfide
Bis-(4-β-dimethylaminopropionyl-2,6-xylyl) disulfide
Bis-(4-β-dimethylaminoethyl-1-naphthyl) disulfide
Bis-(4-β-diethylaminoacetoxyethyl-2,6-xylyl) disulfide
Bis-(4-β-aminoacetoxyethyl-2,6-xylyl) disulfide
Bis-(2-β-aminopropionamidophenyl) disulfide
Bis-(2-glycylaminophenyl) disulfide In the disulfides of this invention, the reactive group, designated by X in the above formula, is attached to the phenyl or naphthyl ring, through a linking radical designated by Y. Of the various combinations of reactive groups and linking radicals by the generic scope of this invention the following are preferred: bromoalkoxy, bromoacylamido, chloroalkyl chloroacylamido, dialkylaminoalkoxycarbonyl, dialkylaminoalkyl, bromoalkyl, aminoalkoxycarbonyl, dialkylaminoacylamido, bromoacyloxyalkyl, chloroacyloxyalkyl, chloroacyloxy, aminoalkyl and chloroacyl.

While any of several methods may be employed to produce the aryl disulfides of this invention it is desired to use the simpler methods such as (A) the reduction of the corresponding sulfonyl chloride to the corresponding mercaptan and the oxidation of the resulting mercaptan to the corresponding disulfide, (B) the controlled reduction of the corresponding sulfonyl chloride to the corresponding disulfide by means of a mineral acid and zinc, or by means of hydriodic acid, (C) the diazotization of the amino-aryl acid and the treatment of the resulting compound with sodium disulfide to form the desired disulfide, and (D) the diazotization of an aromatic amine to form the xanthate and the hydrolyzation of the xanthate to the mercaptan and the oxidation of the mercaptan to the disulfide.

In order to incorporate some of the reactive groups specified into the members of aryl disulfide family, intermediates such as the bis-carboxy-aryl disulfides and the bis hydroxyalkyl-aryl disulfides are prepared. While the preparation of these intermediates, as well as some of the other derivatives employed in preparing the disulfides of this invention, have been described in Journal of Polymer Science, vol. 17, pages 221 and 319 (1955), the methods for preparing still other intermediates and other reactive-group-containing disulfides are described below.

The bis-hydroxyalkyl aryl disulfides may be prepared by several methods such as (A) the diazotization of corresponding hydroxyalkyl-aryl amines, followed by treatment with sodium disulfide or, in sequence, by treatment with potassium ethyl xanthate, alkali and iodine; (B) the reduction of the carboxy-aryl disulfides, carboxyl-alkyl-aryl disulfides, their alkyl esters, or the corresponding carboxy-aryl or carboalkoxy-aryl mercaptans to the corresponding hydroxy-aryl mercaptan, hydroxyalkyl-aryl mercaptan or hydroxyalkoxy-aryl mercaptan with lithium aluminum hydride, and the subsequent oxidation of the mercaptan to the disulfide.

The bis-haloalkyl-aryl disulfides may be prepared from the corresponding hydroxyalkyl-aryl disulfides by use of such reagents as $PCl_3$, $PCl_5$ or $PBr_3$. The aryl disulfides containing hydroxyl groups may be converted to bis-halo-acyl esters by treatment with haloacyl chlorides.

The bis-haloketo-aryl disulfides may be prepared in either of two ways: (A) by Friedel-Crafts haloacylation of the aryl disulfide in presence of anhydrous aluminum halide or (B) by treatment of the diazoketo-aryl disulfide with hydrogen halide.

Bis-haloalkoxy-aryl disulfides may be prepared from the corresponding bis-haloalkoxy-aryl sulfonyl chlorides by controlled reduction. The haloalkoxy-aryl sulfonyl chlorides may be prepared in turn by chlorosulfonation of the haloalkoxy-aromatic compounds.

By treatment of the acid chlorides of aryl disulfides containing carboxy groups with halo alcohols or tertiary-amino alcohols, the corresponding haloalkyl and tertiary-amino alkyl esters of these aromatic disulfides may be prepared. This method is preferred to the direct esterification of these halo alcohols and tertiary-amino alcohols with the free carboxylic compound or the ester interchange with methyl or ethyl esters.

By treatment of the bis-amino-aryl disulfides with various haloacyl halides such as chloroacetyl chloride, bromoacetyl bromide or β-bromopropionyl chloride in a suitable solvent and base catalyst system (e.g. benzene/pyridine or glacial acetic acid/saturated aqueous sodium acetate) the corresponding haloacyl amido derivatives of the diaryl disulfides may be prepared. An alternate method of preparation of this class of compounds is the chlorosulfonation of a haloacylamido-aromatic compound to the corresponding chlorosulfonyl derivative, followed by reduction to the disulfide with 50% hydriodic acid in glacial acetic acid.

The bis-haloacyloxy-aryl disulfides may be prepared from the bis-hydroxy-aryl disulfides by treatment with haloacyl halides.

By treatment of the halocyl, haloalkyl and haloacyloxy-aryl disulfides with secondary amines, the corresponding tertiaryamino-aryl disulfide derivatives may be obtained. Primary-aminoalkyl derivatives of aryl disulfides may be obtained by alkylation or acylation of bis-amino-aryl disulfides to the bis-amino-alkyl-amino-aryl disulfides or bis-aminoacylamido-aryl disulfides by the use of reagents such as the hydrobromide of β-aminoethyl bromide or the hydrochloride of the ethyl ester of glycine. Primary-aliphatic-amine-substituted-aryl disulfides may be prepared by treatment of the corresponding bromoalkyl or bromoacyl derivatives with alcoholic ammonia.

The practice of this invention is further illustrated with respect to the following examples which are to be interpreted as representative rather than restrictive of the scope of this invention. In these examples stem correction has been applied to all melting points reported for purified compounds.

EXAMPLE 1

To 44.5 grams of bis-(2-hydroxymethyl-phenyl) disulfide in a flask cooled by an ice bath, 66.5 grams of phosphorous pentachloride was added cautiously with stirring under a hood. After the initial vigorous reaction had subsided, the mixture was warmed on a hot water bath for one hour. Upon cooling, a brown syrupy mass formed which was decomposed by careful addition of water. By extracting with 350 cubic centimeters of benzene, washing, drying, and evaporating the solvent, 49.4 grams of crude product were obtained. By crystallizing a 10.5 gram portion of the product from 520 cubic centimeters of n-hexane at −78° C., 5.1 grams of a white solid having a melting point of 38–43° C. was obtained. A second recrystallization netted 2.8 grams of bis-(2-chloromethyl-phenyl) disulfide having a melting point of 42.3–44.5° C. Analysis showed the chlorine content to be 21.80% and the sulfur content to be 20.33% by weight. Theoretical amounts of chlorine and sulfur are 22.50% and 20.34% by weight respectively. The material may be represented by the formula:

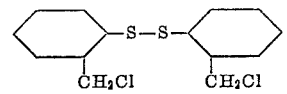

EXAMPLE 2

To a slurry of 0.34 gram of bis-(2-hydroxy-methyl-phenyl) disulfide suspended in 15 cubic centimeters of absolute ether, and cooled to 0° C., a solution of 0.24 gram of phosphorous tribromide in 10 cubic centimeters of absolute ether was added dropwise, with stirring. The system was allowed to stand successively for 0.5 hour at 0° C., 0.25 hour at 25° C., 0.25 hour at reflux, and 3 hours at 25° C. Water was added, and the ether-soluble product isolated by extracting with ether, drying and distilling off the ether at reduced pressure. The product was 0.395 gram of a yellow oil. By recrystallizing from a mixture of 2 cubic centimeters of chloroform and 6.5 cubic centimeters of n-hexane at −78° C., 0.246 gram of fine white solid, having a melting point of 64–66° C., was obtained. By recrystallizing the product again from n-hexane, rosettes of white needles having a melting point of 66.5–67.2° C. were obtained. Analysis showed the carbon, hydrogen and bromine contents to be 42.02, 2.87 and 38.53 percent by weight respectively. Theoretical values for these constituents in bis(2-bromomethyl-phenyl) disulfide are 41.60, 2.99 and 39.54 percent by weight respectively. This compound may be represented by the formula:

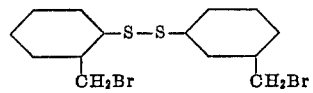

EXAMPLE 3

1.0 gram of bis-(2-chlorocarbonyl-phenyl) disulfide, was dissolved in 30 cubic centimeters of warm benzene. This was added carefully to an ethereal solution of diazomethane prepared as follows:

A solution of 2.5 grams of p-tolylsulfonyl methyl-nitrosoamide in 30 cubic centimeters of ether was cooled in an ice-water bath. To this was added 0.5 gram of potassium hydroxide in 12 cubic centimeters of 90% ethanol. The mixture was allowed to stand 10 minutes to complete the reaction. The diazomethane was then flash distilled over a steam bath as an ethereal solution.

After the initial vigorous reaction had subsided, the reaction mixture was allowed to stand for 1 hour. After removal of excess diazomethane at reduced pressure and further concentration of the solution by heating, 20 cubic centimeters of benzene was added to the crude diazoketone. Upon introduction of dry hydrogen chloride to the system, white crystals of a chloroketone formed. The product was washed with benzene, and dried to yield 0.46 gram of white crystals having a melting point of 183–5° C. Analysis showed the carbon and hydrogen content of the sample to be 52.12 and 3.34 percent by weight respectively. Theoretical amounts of these constituents in bis-(2-chloro-aceto-phenyl) disulfide are 52.00 and 3.26 percent by weight respectively. This compound may be represented by the formula:

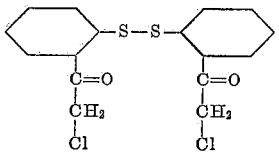

EXAMPLE 4

A solution of 20.0 grams of bis-(2-amino-phenyl) disulfide in a mixture of 450 cubic centimeters of glacial acetic acid and 100 cubic centimeters of aqueous saturated sodium acetate was treated at 0° C. with 16.0 cubic centimeters of chloroacetyl chloride, dropwise, with stirring, over a 20 minute period. The reaction mixture containing a white precipitate was diluted with water, filtered, and the precipitate washed several times with water, and dried on a clay plate. A 34.7 gram quantity of crude chloroacetamido derivative having a melting point of 124.5–127.0° C. was obtained. By recrystallizing the product from 85% aqueous ethanol, white needles having a melting point of 130.2–130.9° C. were obtained. Analysis of a second recrystallized sample having a melting point of 133.2–133.7° C. showed carbon, hydrogen, chlorine, nitrogen and sulfur contents of 48.78, 3.52, 17.72, 7.11 and 16.11 percent by weight respectively. Theoretical amounts of these constituents in bis-(2-chloroacetamido-phenyl) disulfide are 47.87, 3.52, 17.79, 6.98 and 15.97 percent by weight respectively. This compound may be represented by the formula:

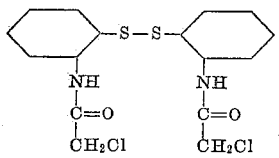

EXAMPLE 5

By treating bis-(2-amino-phenyl) disulfide with bromacetyl bromide in presence of glacial acetic acid and aqueous sodium acetate in exactly the same manner described for preparation of Example 4, a 74% yield of crude, greenish-white bis - (2-bromoacetamido-phenyl) disulfide having a melting point of 138–41° C., was obtained. By recrystallizing the product twice from absolute ethanol, a product in the form of white needles and having a melting point of 157.4–157.7° C. was obtained. Analysis of this product showed carbon, hydrogen, sulfur and bromine contents of 39.23, 2.97, 12.96, and 31.43 percent by weight respectively. Theoretical amounts of these constituents for bis-(2-bromacetamido-phenyl) disulfide are 39.20, 2.88, 13.08 and 32.61 percent by weight respectively. This compound may be represented by the formula:

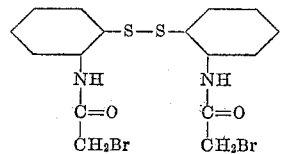

EXAMPLE 6

9.55 grams of 4-chloroacetamido-1-naphthalene sulfonyl chloride (prepared as described in copending application, Serial No. 590,818, filed June 12, 1956, now United States Patent 2,835,701) was mixed with 180 cubic centimeters of glacial acetic acid and 30 cubic centimeters of 50% hydriodic acid. This slurry began forming a gel upon standing 1 hour at 25° C. The gel was stirred thoroughly, forming a slurry which was allowed to stand 24 hours at 25° C. The slurry was treated with 300 cubic centimeters of 10% sodium sulfite to remove the iodine, and was filtered. The precipitate, after washing with water, chlorobenzene, and drying overnight on a clay plate, weighed 6.5 grams. By recrystallizing in two batches from hot glacial acetic acid, crops of 1.76 grams (melting point 195–8° C.) and a less soluble fraction of 1.57 grams (melting point 204–5° C.) were obtained. By recrystallizing these crops from hot dioxane/chlorobenzene mixtures, crops of 0.90 gram (melting point 203.0–3.5° C.) and 0.77 gram of white fine powder (melting point 203.5–203.7° C.) were obtained. Analysis of the latter fraction by titration of the disulfide group with silver nitrate by the method described below indicated a molecular weight of 508 compared to the theoretical value of 501 for bis-(4-chloroacetamido-1-naphthyl) disulfide. The product was insoluble in most organic solvents, and only slightly soluble in hot glacial acetic acid, chlorobenzene, and dioxane. This compound is believed to correspond to the formula:

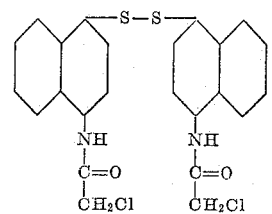

EXAMPLE 7

By treating 60.0 grams bis-(2-amino-phenyl) disulfide in benzene solution with two equivalents of chloroacetyl chloride, and two equivalents of sodium bicarbonate at reflux for 2 hours, cooling, adding water, separating the layers, washing the benzene layer successively with water, concentrated hydrochloric acid, water, sodium bicarbonate, and water, then drying and removing the benzene at reduced pressure, 87.5 grams of a chloroacetylated solid was obtained. This was a difficultly separable mixture of bis-(2-chloroacetamido-phenyl) disulfide and N-dichloroacetyl, N'-chloroacetyl bis-(2-amino-phenyl) disulfide. By recrystallizing from absolute ethanol, 32.8 grams of mixed product in the form of orange colored needles (melting point 144.7–146.2° C.) was obtained. By recrystallizing the least soluble fraction seven more times from absolute ethanol, a 100 milligram fraction (melting point 151.7–152.8° C.) was obtained. Analysis showed the carbon, hydrogen, sulfur, nitrogen, and chlorine contents to be 44.25, 2.96, 14.89, 6.46, and 24.18 percent by weight respectively. The theoretical amounts of these constituents in N-dichloroacetyl, N'-chloroacetyl bis-(2-amino-phenyl) disulfide are 44.13, 3.01, 14.71, 6.43 and 24.42 percent by weight respectively. This compound may be represented by the formula:

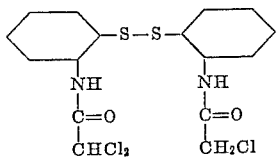

It is possible that the presence of some dichloroacetyl chloride, as an impurity, in the chloroacetyl chloride caused formation of this unsymmetrical disulfide as a minor constituent in the chloroacetylated product.

EXAMPLE 8

4.13 grams of bis-(2-hydroxymethyl-phenyl) disulfide were dissolved in a mixture of 30 cubic centimeters of benzene and 80 cubic centimeters of chloroform. This solution was treated with 6.78 grams of chloroacetyl chloride, and heated to reflux for an hour, then cooled, and poured onto ice. The organic layer was washed first with dilute hydrochloric acid, then with water, dried, and the solvent removed by distillation under reduced pressure. A residue of 7.0 grams of golden colored oil was obtained. Although the oil formed a white flocculent precipitate when cooled to −78° C. in a mixture of chloroform and n-hexane, the product remelted well below 0° C. Analyses showed the carbon, hydrogen, chlorine and sulfur contents of the product to be 48.55, 3.42, 18.31 and 14.66 percent by weight, respectively. Theoretical values for these constituents in bis-(2-chloroacetoxy methylphenyl) disulfide are 50.12, 3.74, 16.44 and 14.86 percent by weight, respectively. The chief constituent in the oil product isolated may be represented by the formula:

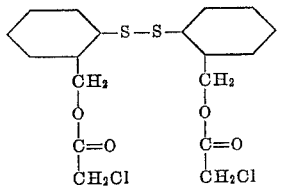

EXAMPLE 9

0.977 gram of bis-(4-carboxy-2,6-xylyl) disulfide was dissolved in 40 cubic centimeters of thionyl chloride and heated to reflux for 3 hours. The excess thionyl chloride was stripped from the system, and 20 cubic centimeters of benzene were added. To this mixture a solution of 0.48 gram β-dimethyl-amino ethanol in benzene was added slowly. The mixture was refluxed for 1 hour. The precipitate which formed was collected by filtration, dried and subsequently dissolved in water. Potassium carbonate was added to the solution and a gum-like material precipitated. The gum was extracted with ether, the ether extract washed twice with a saturated sodium chloride solution, dried over sodium sulfate after which the ether was removed by evaporation. A 0.498 gram quantity of brown syrupy bis-(4-β-dimethyl-amino-ethoxy-carboxy 2,6-xylyl) disulfide was obtained which may be represented by the formula:

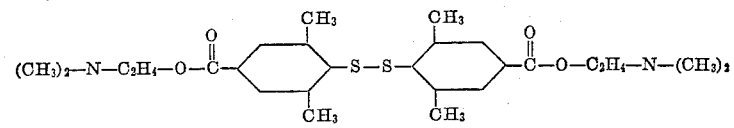

Bis-(4-carboxy-2,6-xylyl) disulfide was prepared by coupling diazolized 4-amino-mesitylenic acid with excess sodium disulfide in the presence of sodium hydroxide by the general method used for preparation of dithio-salicylic acid. The product was recrystallized from dioxane to a melting point 286.5–287.5°C. and contained carbon, hydrogen and sulfur contents agreeing with the theoretical formula. The 4-amino-mesitylenic acid was prepared by the reduction of 4-nitromesitylenic acid according to method of Wheeler and Hoffman, American Chemical Journal, 44, 110 (1910). The 4-nitromesitylenic acid was prepared, in turn, by the chromic acid oxidation of nitromesitylene by the method of Emerson, American Chemical Journal 8, 268 (1886). Nitromesitylene was prepared by nitrating mesitylene according to directions found in Organic Synthesis, Collective Volume II, page 480.

EXAMPLE 10

Upon adding 33.8 grams (0.198 mol) of beta-bromo-propionyl chloride to a solution of 24.8 grams (0.100 mol) of bis-(2-amino-phenyl) disulfide in 250 cubic centimeters of anhydrous benzene, dropwise, with stirring, at 25° C., a precipitate formed. The mixture was refluxed for several hours to complete hydrogen chloride evolution. By cooling the reaction mixture, filtering, washing the precipitate with hexane and air drying, a 19.4 gram quantity of amide product (melting point 149–150° C.) was obtained. By adding three parts of hexane to the filtrate an additional 21.1 grams of amide precipitate (melting point 146.8–148.0° C.) was obtained for a total of 40.6 grams of product (melting point 147–150° C.). By recrystallizing the product repeatedly from 20 parts of hot absolute ethanol a pure white product of very small crystal clusters (melting point 155.0° C.) was obtained. Analysis showed the bromine, sulfur and nitrogen contents to be 30.87, 12.54 and 5.57 percent by weight, respectively. The theoretical amounts of these constituents in bis-(2-bromo-propionamido-phenyl) disulfide are 30.83, 12.37 and 5.40 percent by weight, respectively. This compound may be represented by the formula:

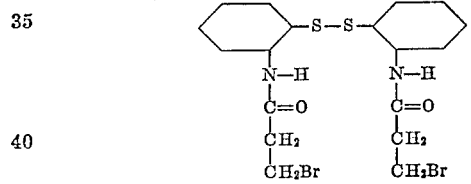

EXAMPLE 11

250 grams of 4-β-bromoethoxy-2,6-xylene sulfonyl chloride (prepared as described in copending application, Serial No. 590,819 filed June 12, 1956, now United States Patent 2,866,821) was treated with a mixture of 3750 cubic centimeters of glacial acetic acid and 1250 cubic centimeters of 50% hydriodic acid, for 24 hours at 25° C. The mixture was poured into dilute sodium thiosulfate to remove iodine. Ice water was added to the mixture to complete precipitation. The crude disulfide was collected, washed, and recrystallized from n-hexane. A yield of 142.7 grams of yellow crystals (melting point 104.8–106.5° C.) was obtained. Analysis of this material showed carbon and hydrogen contents of 46.15 and 4.64 percent by weight, respectively. Theoretical amounts of these constituents in bis-(4-β-bromoethoxy 2,6 xylyl) disulfide are 46.15 and 4.65 percent by weight, respectively. This compound may be represented by the formula:

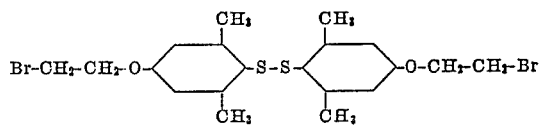

EXAMPLE 12

A solution of 11.6 grams sample of bis-2,6-xylyl disulfide in 400 cubic centimeters of dry carbon disulfide was added dropwise, with stirring to a 2 liter, 3-neck flask containing a Perrier complex (made up of 19.1 grams chloroacetyl chloride which had been added, dropwise, with stirring to an ice cooled suspension of 20.2 grams anhydrous aluminum chloride in 300 cubic centimeters of carbon disulfide and the system allowed to warm to 25° C.) over a 1 hour period during which rapid evolution of hydrogen chloride occurred. The reaction mixture was stirred for an additional hour at 25° C. during which time gas evolution diminished to a very low rate. The mixture was poured onto 2 liters of ice-water containing 200 cubic centimeters of concentrated hydrochloric acid, and extracted with chloroform. The extract was washed with water, dried over anhydrous sodium sulfate, and the solvent removed by distillation at reduced pressure. A brown oil product (16.6 grams) was obtained.

By dissolving the syrup in 25 cubic centimeters of acetone, treating with activated charcoal, filtering, cooling the filtrate to −78° C. and pouring the solution into 250 cubic centimeters of isopropanol pre-cooled to −78° C. a tan precipitate was obtained. By quickly filtering the precipitate and removing traces of solvent a 7.2 gram fraction of oil was obtained containing 14.86% chlorine and 15.88% sulfur. By removing all solvent from the acetone-isopropanol filtrate, an oil fraction weighing 6.6 grams, having 14.50% chlorine and 14.45% sulfur was obtained. Theoretical amounts of these constituents in dichloroacetylated di-xylyl disulfide are 16.59% chlorine and 15.00% sulfur. It is believed that both fractions contain as the chief constituent bis-(4-chloroaceto-2,6-xylyl) disulfide, with a small quantity of monochloracetylated disulfide as an impurity. The dichloroacetylated compound may be represented by the formula:

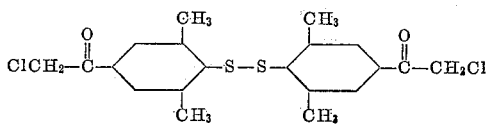

EXAMPLE 13

To 50 milliliters of benzene maintained in an ice bath was added 600 milligrams of bis-(4-β-hydroxyethyl-1-naphthyl) disulfide (prepared as described in copending application, Serial No. 590,842 filed June 12, 1956, now United States Patent 2,844,632. Into this mixture, 140 milligrams of phosphorous tribromide in 20 milliliters of benzene was added slowly while the mixture was being agitated. After a period of 3 hours the reaction mixture was warmed to 40° C. The benzene was removed under reduced pressure and the syrupy residue was dissolved in absolute ethanol. Upon standing overnight a white crystalline material formed. This material had a melting point of 113–115° C. This compound, bis-(4-β-bromoethyl-1-naphthyl) disulfide may be represented by the formula:

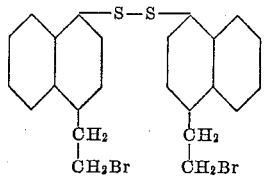

EXAMPLE 14

To 7 grams of 4-chlorosulfonyl-1-naphthyl acetic acid (prepared as described in copending application, Serial No. 590,820 filed June 12, 1956 now United States Patent 2,817,680) was added 90 milliliters of glacial acid and 30 milliliters of hydriodic acid, 50% by weight. This mixture was well shaken and left to stand for 24 hours at room temperature. To the dark colored reaction mixture 300 milliliters of ice-cold 10% by weight sodium thiosulfate solution was introduced. The yellow precipitate that formed was collected by filtration and washed with water. The precipitate was extracted with hot benzene and the soluble product recrystallized from benzene. This product had a melting point of 187–189° C. Analysis, by the method shown below, resulted in a purity of 85% by weight of the product is calculated as bis-(4-carboxymethyl-1-naphthyl) disulfide. This compound bis-4-carboxymethyl-1-naphthyl) disulfide may be represented by the formula:

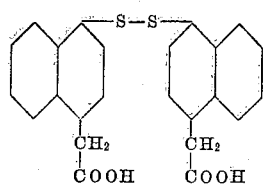

Method for the Determination of Disulfides

This method is a modification of "The Estimation of Thiols and Disulfides by Potentiometric Titration With Silver Nitrate" reported in Biochemical Journal (University of Oxford, England) 59, 234–240 (1955) by R. Cecil and J. R. McPhee.

The equipment consists of commercially available materials such as a potentiometer equipped with both a glass and a silver electrode. Stirring was achieved by means of a magnetic stirrer.

PROCEDURE

An alcoholic solution of a weighed amount of the particular disulfide desired to be tested, was added to a stirred solution made up as follows:

(A) 100 milliliters of 0.5% by weight ammonium oleate, (B) 5 milliliters of concentrated ammonium hydroxide, (C) 15 milliliters of saturated sodium sulfite and (D) approximately a two-fold excess of a known standard silver nitrate solution (the excess here is based upon the amount of disulfide to be tested).

This mixture is heated to mild boiling for 0.5 hour and allowed to cool to room temperature. The excess silver nitrate is back titrated with a standard dodecyl mercaptan solution in alcohol. The endpoint of the titration is determined by procedures normally used in potentiometric titration analysis. The calculations are based on the fact that the sodium sulfite reduces one mol of the disulfide to one mol of the mercaptan.

In addition to the specific disulfides shown in Examples 1 through 14, other disulfides may be prepared in accordance with the practice of this invention by applying the general procedures described above to other reactants containing or into which can be introduced the desired reactive goups.

While a certain representative embodiments and details have been shown for the purpose of illustrating the invention, it will be apparent to those skilled in this art that various changes and modifications may be made therein without departing from the spirit or scope of the invention.

What is claimed is:
1. As compositions of matter the substituted aromatic disulfides defined by the formula

$$(X-Y)_n-Ar-S-S-Ar-(Y-X)_n$$

in which Ar is selected from the group consisting of phenyl and naphthyl radicals, $n$ is a whole number not greater than 2, Y is a radical selected from the group consisting of —R—; —R—O—;

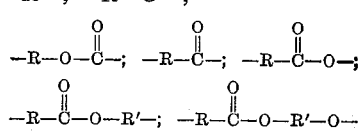

in which R and R' are alkylene radicals selected from the group consisting of primary, secondary and tertiary alkylene radicals containing from 1 to 4 carbon atoms, X is attached to the R portion of Y and is at least 1 and not more than 2 of the same radical selected from the group consisting of Cl—, Br—, H₂N—,

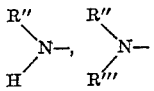

in which R'' and R''' are selected from the group consisting of primary, secondary and tertiary alkyl radicals containing from 1 to 4 carbon atoms.

2. Bis-(4-β-chloroalkoxy-2,6-xylyl)disulfide in which the alkoxy group is selected from the group consisting of primary, secondary and tertiary alkoxy radicals containing from 1 to 4 carbon atoms.

3. Bis-(4-β-bromoalkoxy-2,6-xylyl) disulfide in which the alkoxy group is selected from the group consisting of primary, secondary and tertiary alkoxy radicals containing from 1 to 4 carbon atoms.

4. Bis-(4-chloroalkyl-1-naphthyl) disulfide in which the alkyl radical is selected from the group consisting of primary, secondary and tertiary alkyl radicals containing from 1 to 4 carbon atoms.

5. Bis-(4-bromoalkyl-1-naphthyl) disulfide in which the alkyl radical is selected from the group consisting of primary, secondary and tertiary alkyl radicals containing from 1 to 4 carbon atoms.

6. Bis-(4-β-bromoalkoxy-1-naphthyl) disulfide in which the alkoxy group is selected from the group consisting of primary, secondary and tertiary alkoxy radicals containing from 1 to 4 carbon atoms.

7. Bis-(4-β-chloroalkoxy-1-naphthyl) disulfide in which the alkoxy group is selected from the group consisting of primary, secondary and tertiary alkoxy radicals containing from 1 to 4 carbon atoms.

8. Bis-(2-chloroalkylphenyl) disulfide in which the alkyl radical is selected from the group consisting of primary, secondary and tertiary alkyl radicals containing from 1 to 4 carbon atoms.

9. Bis-(2-bromoalkylphenyl) disulfide in which the alkyl radical is selected from the group consisting of primary, secondary and tertiary alkyl radicals containing from 1 to 4 carbon atoms.

10. Bis-(4-β-chloroalkoxycarbonyl-2,6 xylyl) disulfide in which the alkoxy group is selected from the group consisting of primary, secondary and tertiary alkoxy radicals containing from 1 to 4 carbon atoms.

11. Bis-(4-β-bromoalkoxycarbonyl-2,6 xylyl) disulfide in which the alkoxy group is selected from the group consisting of primary, secondary and tertiary alkoxy radicals containing from 1 to 4 carbon atoms.

12. Bis - (2-chloroacyloxyalkyl - phenyl) disulfide in which the alkyl radical is selected from the group consisting of primary, secondary and tertiary alkyl radicals containing from 1 to 4 carbon atoms.

13. Bis - (2 - bromoacyloxyalkyl - phenyl) disulfide in which the alkyl radical is selected from the group consisting of primary, secondary and tertiary alkyl radicals containg from 1 to 4 carbon atoms.

14. Bis-(4-β-dialkylaminoalkoxycarboxy-2,6 xylyl) disulfide in which the alkoxy group is selected from the group consisting of primary, secondary and tertiary alkoxy radicals containing from 1 to 4 carbon atoms.

15. Bis-(4-β-dialkylaminoalkyl-1-naphthyl) disulfide in which the alkyl radical is selected from the group consisting of primary, secondary and tertiary alkyl radicals containing from 1 to 4 carbon atoms.

References Cited in the file of this patent

UNITED STATES PATENTS

| | | |
|---|---|---|
| 1,821,256 | Brightman et al. | Sept. 1, 1931 |
| 2,064,395 | Tschunkur et al. | Dec. 15, 1936 |
| 2,362,289 | Mikeska | Nov. 7, 1944 |
| 2,388,477 | Fryling | Nov. 6, 1945 |
| 2,388,514 | Zwicker et al. | Nov. 6, 1945 |
| 2,470,945 | Paul | May 24, 1949 |
| 2,521,870 | Proell | Sept. 12, 1950 |
| 2,571,740 | Marson | Oct. 16, 1951 |
| 2,667,503 | Senn | Jan. 26, 1954 |
| 2,683,166 | Hook et al. | July 6, 1954 |
| 2,695,898 | Lober et al. | Nov. 30, 1954 |

FOREIGN PATENTS

| | | |
|---|---|---|
| 599,741 | Great Britain | Mar. 19, 1948 |